United States Patent [19]

Keller et al.

[11] Patent Number: 5,007,059
[45] Date of Patent: Apr. 9, 1991

[54] NONLINEAR EXTERNAL CAVITY MODELOCKED LASER

[75] Inventors: Ursula Keller, Atlantic Highlands; Wayne H. Knox, Rumson, both of N.J.

[73] Assignee: AT&T Bell Laboratories, Murray Hill, N.J.

[21] Appl. No.: 523,622

[22] Filed: May 15, 1990

[51] Int. Cl.$^5$ ............................................. H01S 3/098
[52] U.S. Cl. ...................................... 372/18; 372/21; 372/97; 372/99
[58] Field of Search ...................... 372/18, 97, 99, 21

[56] References Cited

U.S. PATENT DOCUMENTS 4,268,801  5/1981  Stappaerts .......................... 372/97
4,635,263  1/1987  Mollenauer .......................... 372/3

OTHER PUBLICATIONS

L. F. Mollenauer et al., Optics Letters, vol. 9, No. 1, Jan. 1984, "The Soliton Laser", pp. 13–15.

K. J. Blow et al., J. Opt. Soc. Am. B, vol. 5, No. 3, Mar. 1988, "Mode-Locked Lasers with Nonlinear . . . ", pp. 629–632.

K. J. Blow et al., Optics Letters, vol. 13, No. 11, Nov. 1988, "Improved Mode Locking of an F-Center Laser . . . ", pp. 1026–1028.

P. N. Kean et.al., Optics Letters, vol. 14, No. 1, Jan. 1, 1989, "Enhanced Mode Locking of Color-Center Lasers", pp. 39–41.

J. Mark et al., Optics Letters, vol. 14, No. 1, Jan. 1, 1989, "Femtosecond Pulse Generation in a Laser . . . ", pp. 48–50.

P. M. W. French et al., Optics Letters, vol. 14, No. 12, Jul. 1, 1989, "Femtosecond Pulse Generation from Titanium-doped . . . ", pp. 686–688.

E. P. Ippen et al., J. Opt. Soc. Am. B, vol. 6, No. 9, Sep. 1989, "Additive Pulse Mode Locking", pp. 1736–1745.

J. Goodberlet et al., Optics Letters, vol. 14, No. 20, Oct. 15, 1989, "Femtosecond Passively Mode-Locked Ti: Al$_2$O$_3$ Laser . . . ", pp. 1125–1127.

Primary Examiner—Frank Gonzalez
Assistant Examiner—Susan S. Morse
Attorney, Agent, or Firm—Gregory C. Ranieri

[57] ABSTRACT

Modelocking of a solid state laser such as a Ti:Al$_2$O$_3$ laser is achieved by employing an external cavity defined by spatially separated reflective elements wherein at least one of the reflective elements exhibits a nonlinear characteristic in response to an impinging light beam. Exemplary nonlinear reflective elements are described using bulk semiconductor material or semiconductor quantum well structures integrated with a rear reflector such as a stack of quarter-wave thick dielectric or semiconductor material. Tuning control of the nonlinear reflective element may be introduced with temperature control arrangements and with mechanical translation arrangements in conjunction with lateral band gap engineering of the semiconductor material.

16 Claims, 2 Drawing Sheets

NONLINEAR EXTERNAL CAVITY MODELOCKED LASER

TECHNICAL FIELD

This invention relates to coherent light sources and, more particularly, to coupled-cavity lasers employing a nonlinear external cavity for modelocking.

BACKGROUND OF THE INVENTION

Picosecond and femtosecond optical pulses are finding wide application in diverse technologies such as communications and electrooptic sampling. Modelocking is generally employed to obtain short pulses from the laser. Nonlinear external cavities coupled to a solid state laser have permitted generation of much shorter pulses than those available from the solid state laser itself. This phenomenon is understood to occur because the nonlinear external cavity increases the modelocked bandwidth of the solid state laser and permits more efficient communication of phase information between modes coupled in the cavity.

One striking example of a modelocked laser having a nonlinear external cavity is the soliton laser described by Mollenauer in U.S. Pat. No. 4,635,263 and in *Optics Letters*, Vol. 4, No. 1, pp. 13-15 (1984). The soliton laser includes a main cavity coupled to a nonlinear external cavity. The main cavity comprises a gain medium such as a solid state element which is optically pumped by another laser. Pumping is either continuous wave or pulsed. For the nonlinear external cavity, coupling to the main cavity requires that the phase of the signal injected back into the main cavity depends on intensity such as by a nonresonant Kerr effect nonlinearity. When employing an optical fiber to provide the nonlinear effect in the external cavity, this laser supports soliton pulse formation when the net group velocity dispersion is negative, that is, when group delay decreases with increasing frequency.

While the soliton laser uses the negative group velocity dispersion of the fiber in the coupled nonlinear external cavity, other important lasers have been developed using positive group velocity dispersion of the fiber. Although the lasers do not form soliton pulses, short pulse formation has been observed. Additive pulse modelocked lasers (APM) and coupled cavity modelocked lasers (CCM) are examples of such lasers wherein the nonlinear external cavity is matched to the main cavity in such a way that the returning pulse adds coherently with the main cavity pulse. As a result, chirp is caused by the nonlinear external cavity causes constructive interference at the peak of the optical pulse while simultaneously causing destructive interference in the wings or extremities of the optical pulse. This facilitates the pulse shaping and shortening process. Additive pulse modelocked lasers have been described by Ippen et al., in *J. Opt. Soc. Am. B*, Vol. 6, No. 9, pp. 1736-45 (1989) and coupled cavity modelocked lasers have been described by Kean et al. in *Optics Letters*, Vol. 14, No. 1, pp. 39-41 (1989).

While pulses as short as several hundred femtoseconds have been reported with some of the lasers described above, certain technical problems hinder development and progress with these lasers. Difficulties arise with respect to realizing a working arrangement of the necessary laser elements. Typical realization times for additive pulse modelocked lasers are on the order of several months to, in some cases, one year. Alignment of the elements tends to be a major contributing cause. Coupling from one cavity to the other is further complicated when the external cavity employs a waveguide element such as an optical fiber. Moreover, for lasers having optical fiber in the external cavity, nonlinear effects are increased solely by increasing the length of the optical fiber. Finally, it is important to note that, in practice, most of the lasers described above require some external stimulus such as a narrow noise peak to begin pulse generation.

SUMMARY OF THE INVENTION

Simplified design, straightforward and fast realization, automatic starting behavior, controllable nonlinear effects and strong modelocking are achieved in a coupled cavity laser employing a nonlinear external coupled cavity wherein the nonlinear external coupled cavity includes a remote nonlinear reflector element. Generally, the remote nonlinear reflector element is designed to operate in a near-resonant condition.

The coupled cavity laser includes a CW pumped gain medium in the main cavity and an element for incorporating a near-resonant nonlinearity in the nonlinear external cavity. Such a nonlinearity is provided by a bulk semiconductor material or by a semiconductor quantum well device. This near-resonant, low dispersion nonlinearity provides a large nonlinear phase shift signal which, when injected back into the main cavity, induces strong modelocking of the laser.

Variation of the nonlinear effect may be controlled by including a lens element whose position may be changed relative to the remote nonlinear reflector element.

BRIEF DESCRIPTION OF THE DRAWING

A more complete understanding of the invention may be obtained by reading the following description of a specific illustrative embodiment of the invention in conjunction with the appended drawing in which.

Remote reflector elements are realizable from semiconductor materials and combined semiconductor/dielectric materials. Nonlinear effects for the remote reflector element are provided by bulk semiconductor material and from semiconductor quantum well material. Reflectivity of the remote reflector element is provided by a semiconductor or dielectric stack of quarter wave layers on one end of the bulk or quantum well semiconductor material. As such, the nonlinear and reflective portions of the remote reflector element are easily integrated using standard growth and deposition techniques.

Since the remote reflector element responds to the optical beam, it is generally desirable to have the predetermined wavelength of the main cavity laser greater than or substantially coincident with the exciton resonance wavelength of the bulk semiconductor material or semiconductor quantum well material comprising the remote reflector element. At the present time, operation of the laser appears best when the main cavity laser is tuned several tens of meV below the exciton resonance energy (that is, tuned to a wavelength above the exciton resonance wavelength) for the semiconductor quantum well material. For this near-resonant operating condition, the quantum wells provide low dispersion and a large nonlinear phase shift of the impinging optical beam.

Figure 1:
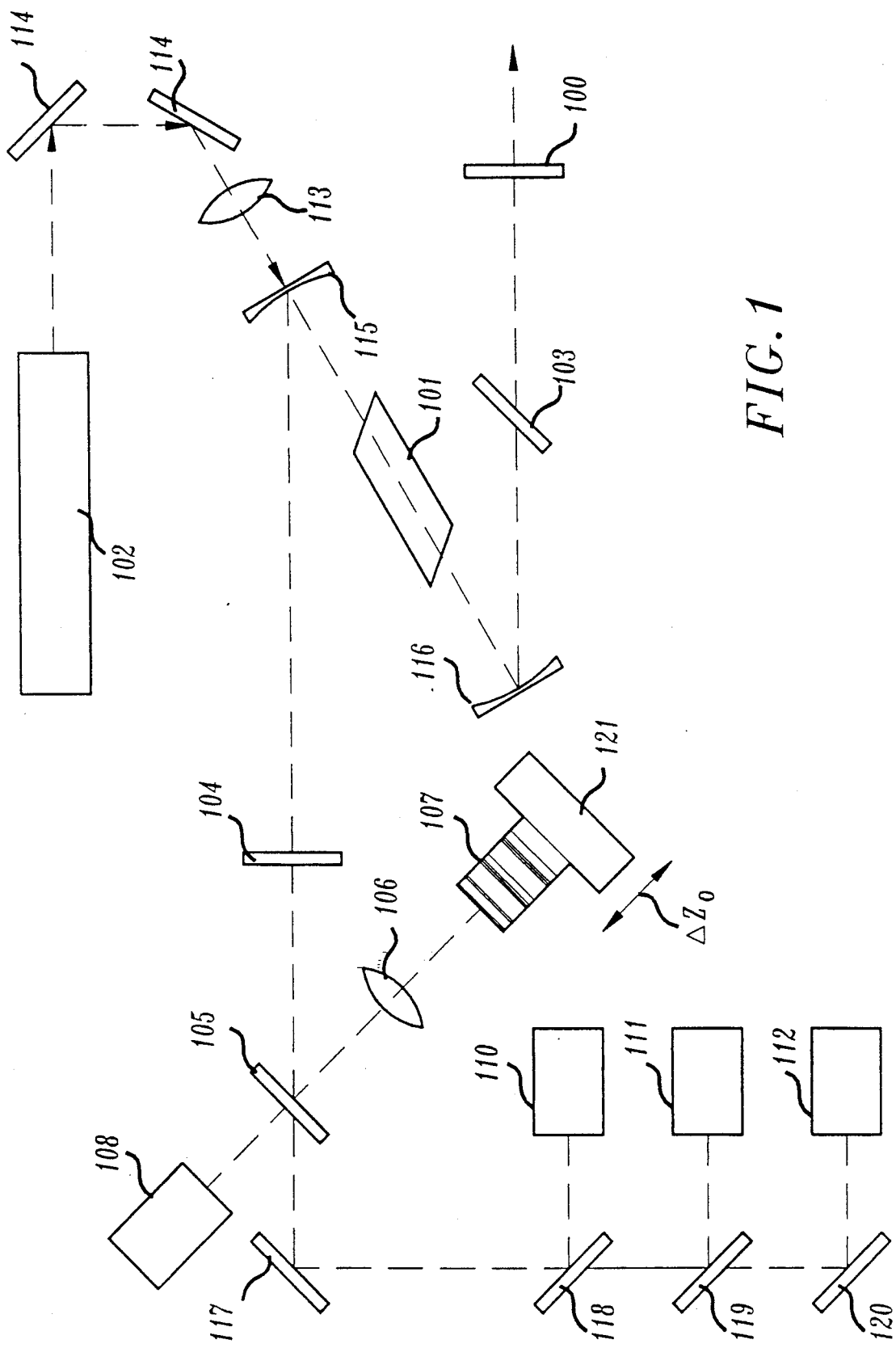
FIG. 1 shows a schematic of a nonlinear external cavity modelocked laser in accordance with the principles of the present invention.

One embodiment of the nonlinear external cavity modelocked laser realized in accordance with the principles of the present invention is shown in FIG. 1. Gain medium 101 provides gain for the main cavity. It is realizable as a standard Ti:Al$_2$O$_3$ rod. This rod has Brewster angle end facets and is approximately 23 mm in length. The gain medium is pumped by an all-lines emission of argon laser 102 having an average power between 5 and 15 W. Mirrors 114 redirect the pump beam into the main laser cavity. Lens 113 focuses the pump beam to concentrate its intensity on the gain medium. The gain medium is incorporated in a "Z" astigmatism-compensated cavity defined by end mirrors 100 and 104. End mirror 104 was designed with 97% reflectivity to serve as an output coupler of the optical beam from the main cavity laser. Filter 103 is included in the main cavity to provide tuning. Filter 103 may be realized with a birefringent plate as a Lyot filter. End mirror 100 is generally high reflectivity approaching 100%. Curve mirrors 115 and 116 provide focusing of the optical beam onto the gain medium in the main cavity.

The nonlinear external cavity coupled to the main cavity is defined by the optical path between end mirror 104 and remote reflector element 107. In this embodiment, the nonlinear external cavity is folded to permit the inclusion of output coupler 105 which provides an output port for the modelocked optical beam from the nonlinear external cavity modelocked laser. Output coupler 105 was designed with a 90% reflectivity. A piezoelectric element (not shown) attached to the output coupler permitted small movements of the output coupler to effect precise cavity length matching.

Cavity length matching has been well defined in the art. It is contemplated that the optical path length of the external cavity be set substantially equal to an integral multiple or submultiple of the optical path length for the main cavity laser.

The nonlinear external cavity also includes lens 106 which is desirably coated with antireflection material. Lens 106 focuses the optical beam onto remote reflector element 107. By moving the position of lens 106 with respect to remote end reflector 107 via a piezoelectric element (not shown) or a standard translation element (not shown), it is possible to vary the intensity of the optical beam impinging on the remote end reflector. As a result, the nonlinear effects provided by remote end reflector 107 are proportionately changed. Lens 106 is also carefully positioned to precisely mode match the optical beam reflected from remote end reflector 107 back into the external cavity. The focusing length of lens 106 is determined in accordance with the nonlinearity of the semiconductor material in the remote end reflector and the pump optical power. In this embodiment, a lens having fivefold magnification has been employed.

Figure 2:
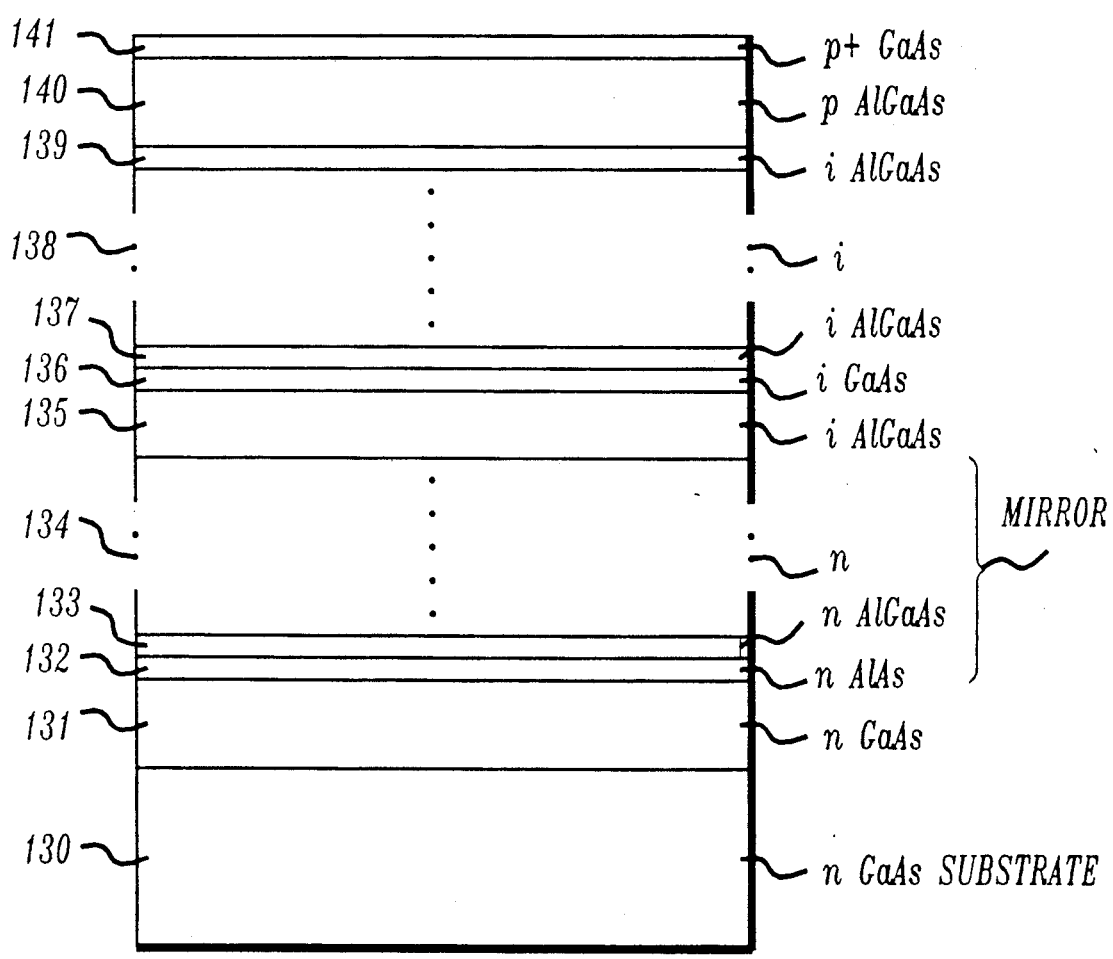
FIG. 2 shows an exemplary nonlinear reflector element for use in the laser shown in FIG. 1. DD Coupled cavity lasers generally include a laser for generating an optical beam at a predetermined wavelength. By including a nonlinear external cavity coupled to the laser in the main cavity, it is possible to induce modulation of the optical beam and thereby provide modelocking. In accordance with the principles of the present invention, the nonlinear external cavity includes a remote reflector element which reflects the optical beam impinging thereon and nonlinearly varies a predetermined parameter of the optical beam.

One embodiment for remote end reflector 107 is shown in FIG. 2. This embodiment is epitaxially grown using standard semiconductor growth techniques as a p-i-n structure. Nonlinear effects are provided predominantly in the intrinsic region by a series of 50 GaAs quantum wells of 10 nm width separated by 50 AlGaAs barriers of 8 nm width wherein the Al mole fraction is approximately 0.3. Ten periods of quarter wave dielectric layers comprising AlAs and AlGaAs (Al mole fraction of approximately 0.2) provide a high reflectivity back layer which returns the optical beam back into the cavity. For this example, the dielectric reflector provides reflectivity centered about 850 nm. Remote end reflector 107 has been antireflection coated and In-soldered onto a copper block which is temperature controlled by stabilizing bath 108. Stabilizing bath 108 provides temperature control and good thermal stability for the nonlinear external cavity even under high power conditions. In the present embodiment, the remote end reflector dissipates heat effectively. This is in contrast to thin film reflectors which are incapable of reflecting optical beams having several watts of optical power as is anticipated for the present invention.

Output coupler 105 is realized as a folding mirror. As shown in FIG. 1, the output is coupled via turning mirrors 117 through 120 into a number of utilization devices such as RF spectrum analyzer 110, auto correlator 111, and fast detector and sampling oscilloscope 112. The utilization devices listed above are useful in making necessary adjustments for optimizing the modelocking process.

Translator 121 attached to the remote end reflector 107 permits adjustments in the optical path length of the external cavity to provide cavity length matching which is desirable for optimizing laser operation.

The near resonant nonlinearity of the remote reflector element is distinctively different from nonresonant Kerr type nonlinearities used in previous techniques. It has been found that pulse formation is not based on additive pulse modelocking and is based on a large nonlinear amplitude signal which, when injected back into the main cavity, provides strong modelocking of the laser. High Q of the main cavity appears desirable for short pulse formation. High intracavity intensity enhances gain saturation. Detuning the optical path length of the external cavity by 2 mm in either direction still permitted pulse durations to be achieved on the order of 10 psec.

An important benefit of the present invention is that a strong nonlinearity is obtained over a very short path length. As opposed to prior designs, there is no need for a waveguide to support light propagation over a long interaction length. Since the present invention introduces very little dispersion into the optical beam, it is possible to vary the strength of the nonlinearity without varying dispersion by using the focal length of lens 106.

Tunability is contemplated by employing temperature compensation or by growing semiconductor material having a wedged or laterally changing element concentration such as a changing Al concentration for AlGaAs.

Semiconductor materials contemplated for use in the remote end reflector include group III-V compounds such as InGaAs/GaAs and InGaAsP/InP for exemplary quantum well structures. Other materials for quantum wells and for the bulk semiconductor materials are well known in the art.

The main cavity laser is contemplated as any one selected from the group consisting of Nd:YAG, Nd:BEL, Nd:glass, and NaCl:$F_2^+$.

We claim:

1. An optical device comprising a laser for generating an optical beam at a first wavelength and a nonlinear external cavity means coupled optically to said laser for inducing modulation of said optical beam to modelock said optical beam, said nonlinear external cavity means including remote reflector means responsive to said optical beam for reflecting and nonlinearly varying a predetermined parameter of said optical beam.

2. The optical device defined in claim 1 wherein said nonlinear external cavity means further includes a lens for focusing said optical beam onto said remote reflector means.

3. The optical device defined in claim 2 wherein said nonlinear external cavity means further includes translation means coupled to said lens for changing the position of said lens relative to said remote reflector means to vary an intensity of said optical beam focused onto said remote reflector means.

4. The optical device defined in claim 1 wherein said nonlinear external cavity means includes output means for coupling an output optical beam from said nonlinear external cavity means.

5. The optical device as defined in claim 1 wherein the remote reflector means includes translation means for changing the position of the remote reflector to vary an optical path length of said nonlinear external cavity means.

6. The optical device as defined in claim 1 wherein the remote reflector means includes a semiconductor material structure for nonlinearly varying the optical beam at said first wavelength and a reflector integrated with said semiconductor material structure and positioned on one end surface of said semiconductor material structure.

7. The optical device as defined in claim 6 wherein the semiconductor material structure includes substantially homogeneous bulk semiconductor material having an exciton resonance wavelength substantially equal to or greater than said first wavelength.

8. The optical device as defined in claim 7 wherein the substantially homogeneous bulk semiconductor material includes GaAs and said laser includes a Ti:Al$_2$O$_3$ gain medium.

9. The optical device as defined in claim 7 wherein the substantially homogeneous bulk semiconductor material includes InGaAs and said laser includes a gain medium selected from the group consisting of Nd:YAG and Nd:BEL and Nd:glass.

10. The optical device as defined in claim 7 wherein the substantially homogeneous bulk semiconductor material includes InGaAsP and said laser includes a NaCl:$F_2^+$ gain medium.

11. The optical device as defined in claim 6 wherein the semiconductor material structure includes at least one quantum well region having an exciton resonance wavelength substantially equal to or greater than said first wavelength.

12. The optical device as defined in claim 11 wherein the quantum well region includes first and second AlGaAs barrier layers and a GaAs well layer between said first and second barrier layers and said laser includes a Ti:Al$_2$O$_3$ gain medium.

13. The optical device as defined in claim 11 wherein the quantum well region includes first and second GaAs barrier layers and a InGaAs well layer between said first and second barrier layers and said laser includes a gain medium selected from the group consisting of Nd:YAG and Nd:BEL and Nd:glass.

14. The optical device as defined in claim 11 wherein the quantum well region includes first and second InP barrier layers and a InGaAsP well layer between said first and second barrier layers and said laser includes a NaCl:$F_2^+$ gain medium.

15. The optical device as defined in claim 1 wherein an optical path length for said nonlinear external cavity means is substantially equal to an integer multiple of an optical path length for said laser.

16. The optical device as defined in claim 1 wherein an optical path length for said laser is substantially equal to an integer multiple of an optical path length for said nonlinear external cavity means.

* * * * *